United States Patent
Altemark et al.

(10) Patent No.: US 7,256,508 B2
(45) Date of Patent: Aug. 14, 2007

(54) WIND FARM (75) Inventors: Jens Altemark, Rendsburg (DE); Björn Matzen, Nieby (DE); Jörg Zeumer, Rendsburg (DE)

(73) Assignee: Repower Systems AG, Hamburg (DE)

( * ) Notice: Subject to any disclaimer, the term of this patent is extended or adjusted under 35 U.S.C. 154(b) by 21 days.

(21) Appl. No.: 10/559,924

(22) PCT Filed: Jun. 15, 2004

(86) PCT No.: PCT/EP2004/006434
§ 371 (c)(1),
(2), (4) Date: Dec. 8, 2005

(87) PCT Pub. No.: WO2004/114493
PCT Pub. Date: Dec. 29, 2004

(65) Prior Publication Data
US 2006/0214428 A1   Sep. 28, 2006

(30) Foreign Application Priority Data
Jun. 16, 2003 (DE) .............................. 103 27 344

(51) Int. Cl.
*F03D 9/00* (2006.01)
*H02P 9/04* (2006.01)

(52) U.S. Cl. .......................................... 290/44; 290/55

(58) Field of Classification Search ............ 290/55, 290/54, 43, 44; 415/7, 2.1, 4.2, 907, 905, 415/4.5, 908; 416/132 B; 60/398
See application file for complete search history.

(56) References Cited

U.S. PATENT DOCUMENTS 2,911,541 A * 11/1959 Neufville et al. ........... 290/4 R
4,205,235 A * 5/1980 Pal et al. ...................... 290/44
4,281,376 A    7/1981 Munchow et al.
4,584,486 A * 4/1986 Quynn .......................... 290/44

(Continued)

FOREIGN PATENT DOCUMENTS

DE         100 40 273 A1    2/2002

(Continued)

OTHER PUBLICATIONS

WO 03/029648A1, Henriksen et al., Method and a Computer System for Handling Operational Data of Wind Power Plants, Apr. 10, 2003.

*Primary Examiner*—Julio C. Gonzalez
(74) *Attorney, Agent, or Firm*—Rankin, Hill, Porter & Clark LLP (57) ABSTRACT

The invention relates to a wind-driven power-plant comprising a rotor (100) which is fitted with at least one rotor blade and which is connected directly or indirectly to a generator for power generation, further including an electrical assembly made up of different electrical sub-assemblies including electronic, electrical and/or electromechanical and/or sensor elements and/or electrotechnical safety elements, where, depending on their purposes, all elements/components of one or more electrical sub-assemblies or specific elements of the electrical sub-assembly are combined into one or more function modules that implement at least one function in relation to the generation of electric power, where a parallel module is associated with at least one function module, and the parallel module is able to implement the same or nearly the same function as the function module in normal operation.

35 Claims, 2 Drawing Sheets

U.S. PATENT DOCUMENTS

| | | |
|---|---|---|
| 5,083,039 A | 1/1992 | Richardson et al. |
| 5,973,481 A * | 10/1999 | Thompson et al. ............ 322/7 |
| 6,566,764 B2 * | 5/2003 | Rebsdorf et al. ............ 290/44 |
| 6,946,750 B2 * | 9/2005 | Wobben ...................... 290/44 |
| 7,119,452 B2 * | 10/2006 | Larsen ........................ 290/55 |
| 2003/0227172 A1 * | 12/2003 | Erdman et al. ............... 290/44 |
| 2004/0119292 A1 * | 6/2004 | Datta et al. .................... 290/44 |
| 2005/0116476 A1 * | 6/2005 | Feddersen ................... 290/44 |
| 2005/0225090 A1 * | 10/2005 | Wobben ...................... 290/44 |
| 2006/0103137 A1 * | 5/2006 | Wobben ...................... 290/44 |
| 2006/0192390 A1 * | 8/2006 | Juanarena Saragueta et al. 290/44 |

FOREIGN PATENT DOCUMENTS

DE          101 17 212 A1     10/2005

* cited by examiner

WIND FARM

BACKGROUND OF THE INVENTION

The present invention relates to a wind-driven power-plant comprising an electric assembly.

Known wind-driven power-plants comprise a rotor fitted with at least one blade and connected to an electric power generator of which the output in general is fed into an electrical network.

Electrical power networks entail, minimum requirements illustratively for hookup between the wind-driven power-plant and a network such as maintaining network frequency, operational power output and generation of reactive power in order to assure safety and reliability of network operation.

To meet those requirements, wind-driven power-plants comprise an electrical assembly with which to adjust also the given parameters of the public power network, also to regulate and control said power-plant illustratively by adjusting angular attitude of the rotor blade(s).

In general, the electrical assembly is composed of different sub-assemblies which are fitted with electronic, electrical and/or electromechanical and/or sensor elements/components and/or electrical safety devices.

Illustratively, the electrical elements/components may be control computers. Electrical elements/components may be control cables, power supplies, also uninterruptible power supplies. The electromechanical components include relays and contactors. Sensor elements include all devices detecting measurement data such as temperature sensors, pressure sensors, further tachometers and wind speed detectors.

As a rule the electrical sub-assemblies comprise at least one device connecting the generator to an electrical network and at least one control fitted with a management computer, said control among other functions also optimizing the power output.

In order to make the power-plant economical, it must be reliably ready when the wind rises. For that reason the power-plants are designed in general in a manner to avoid shutdowns due to power-plant defects. Illustratively, especially high-grade components exhibiting low failures rates are used In case defectiveness should still be encountered, a technician must travel to the power-plant and remedy the defect on site. However, and as regards offshore power-plants, if the weather were poor, the technician might be prevented from reaching the power-plant, or only with great difficulty. In that event, the power-plant would be idle for a significant time interval, and thus unproductive.

Weather conditions, in particular wave heights, might be so adverse that access to the power-plant might only be implemented using a helicopter hoist mechanism whereby the technician with his tools and replacement parts is lowered from a helicopter by cable onto a platform. In such a case only comparatively modest repairs can be carried out, while bulky components cannot be replaced.

Especially as regards offshore power-plants, they operate especially productively on account of their size, and the economical loss in case of failure is especially large too.

BACKGROUND OF THE INVENTION

The objective of the present invention is to create a wind-driven power-plant comprising an electric assembly compensating for defects as they occur so that the power-plant remains ready to operate, and unnecessary periods of interrupted operation and their entailed costs are averted in this manner.

The wind-driven power-plant of the invention comprises a rotor fitted with at least one blade and connected directly or indirectly to an electric power generator, further it comprises an electric assembly composed of different electrical sub-assemblies that are fitted with electronic, electric and/or electromechanical and/or detecting elements/components and/or electrotechnical safety devices.

In the present invention, all or specific elements/components of an electric sub-assembly are combined in relation to their purposes into one or more function modules (250, 250'), such function module(s) implementing at least one function in conjunction with the generation of electrical power generation, at least one parallel module being present for at least one function module, said parallel module implementing, or being able to implement, during typical power-plant operation, an identical or analogous function of the function module, the function module and the parallel module being connected or connectable to each other in such a way that, in the event of operational malfunction affecting a functional or a parallel module, the remaining still operational parallel or operational modules shall maintain, at least in part, the generation of electrical power.

In the present invention, specific or all elements/components of the sub-assemblies are combined into function modules. The function modules so created are configured in a way that they implement specific functions relating to the power-plant's generation of electricity. At least one parallel module is provided for one function module, the purpose of the parallel module(s) being to maintain electric power generation.

Using the parallel module makes it possible to delay replacing a defective function module until the weather improves or until the next scheduled maintenance operation. This feature offers the advantage, in particular, as regards offshore power-plants that travel to said plants shall be limited substantially to regularly scheduled maintenance and thereby repair costs may be lowered.

The parallel module, and in part also the function module, may be designed differently to solve this problem.

On one hand, the parallel module may be designed to carry out the same operation as does the function module. In the process the parallel module may carry out that function simultaneously with the function module, namely, the electric power generation is carried out simultaneously by the two modules, whereby, in the event of operational malfunction in either parallel or function module, the power generation of the remaining, effective module will continue and in this manner continuous operation, even though restricted, is advantageously attained for the power-plant.

One particular configuration of generator technology has long been known. In this configuration and for economic reasons, the generator assembly was split into two to four parallel generators, for instance two 750 kw generators for one 1.5 Mw power-plant or four 250 kw generators for 1 Mw power-plant. These designs however only addressed the problem that the larger generators could not be manufactured at all, or when, then at substantially higher costs than a larger number of smaller generators, in other words, at the time the goal was to reduce capital costs. The gear units of this machinery indeed were not suitable to continue generating power in the event of failure of one of the generators because the resultant asymmetrical loading would have damaged the gearing.

The German patent document DE 100 40 273.9 A1 discloses a generator configuration comprising at least two stators besides one rotor, each stator being associated with at least one converter. However substantial additional costs are incurred when one generator is fitted with at least two stators.

Even in the embodiment of the present invention, capital costs are initially increased on account of the more complex design, though to a lesser extent than for one generator with at least two stators. Relative to the state of the art, the lesser additional costs of the invention offer the prime advantage that amortizing said additional costs is attained more rapidly on account of the higher reliability of power generation over the 20-year life of the wind-driven power-plant.

The parallel module moreover may be designed in a manner that it shall operate similarly to the function module, where however this similar operation does or may contribute to power generation just as does the function module. Illustratively the parallel module may be more compact than the function module and hence be produced more cheaply.

Again the parallel module may be configured in a way that it shall operate jointly with the function module.

The design of a wind-driven power-plant comprising two control computers in the conventional master-slave configuration is known. The first (master) control computer is illustratively used for override operation and for matching the power-plant to the electrical public power, in particular to match the generated power to predetermined input parameters of the public power network. The second control computer (slave) assumes recording and analyzing sensor data and controlling and regulating the power-plannt during short term operational procedures.

In the present invention, the two computers may be designed in a manner that if one fails, the other may assume its operations. The two computers also may be over-sized so that the computer remaining operative may operate instead of and for both in the case of failure of one. Economically, however, over-sizing should be minimized to just ensure essential maintenance of power generation even in the face of the drawback that the still viable computer no longer can carry out some operations, for instance optimizing power or compensating for extreme ambiences (extreme wind gusts, extreme incidents in the public power network such as voltage or frequency notches.

The invention also allows the parallel module to be passive during normal power-plant operation while being activated only upon failure of the function module and in this manner at least partly maintain power generation.

Illustratively, the detecting elements measuring ambient effects such as wind speed, temperature etc. may be combined into one function module called "sensors". In this respect a parallel module might include the same detectors. If the "sensors" function module were to fail, then the "sensors" parallel module would be activated and would assume the former's assignment.

In one advantageous embodiment mode of the present invention, the parallel module furthermore may be designed in a manner that upon failure of the function module, the latter's operation may be completely taken over by former. This design offers the advantage that the parallel module operates virtually as a replacement module and that, in the event of function module failure, electric power generation may be maintained in full and no economic losses are incurred.

In a further advantageous embodiment of the invention, the wind-driven power-plant comprises at least two function modules implementing identical or similar operations and at least one parallel module that preferably completely assumes operations of one function module after it fails.

The feature of a minimum of two function modules jointly carrying out one function for electric power generation offers the advantage that the parallel module in turn need only be half size to completely maintain power generation in the event of an element/component failure. Increasing the number of function modules lowers the size of the required parallel module commensurately. Depending on the probability of malfunction and the costs of said function module, the economically optimal configuration may be determined individually.

However in another further advantageous embodiment mode of the present invention, the parallel module for instance may be selected smaller and hence more advantageously, whereby it shall only partly assume the operations of the function module. This design variation offers the advantage of maintaining at least partial electric power generation in economic manner.

The above discussed control system redundancy entails difficulties in diagnosing which of two modules is malfunctioning when there is discrepancy between the performances of two modules. Accordingly, elements especially susceptible to malfunctioning may be used advantageously in triplicate. This feature allows diagnosing properly a defective or malfunctioning module by using two coinciding results over one deviating from them as long as only one module shall deviate. In the event of two malfunctioning modules, diagnosis still may be properly carried out using a control program based on the plausibility test (knowledge based expert system).

In another advantageous embodiment mode of the present invention, an electrical sub-assembly may include a control device optimizing electric power generation and itself comprising at least one operations managing computer.

In yet another advantageous embodiment mode of the present invention, the wind-driven power-plant may include at least one feed module feeding electric power to said control device, said feed module in a still further and advantageous embodiment mode of the invention being designed to be independent of the public electric power supply.

Preferably at least two feed modules feeding the control device shall be independent of the public power supply in order to assure power to the control device even when the public power supply fails. Redundancy of the control power independent of public power is especially important as regards a wind-driven power-plant because control failure would entail emergency braking and thereby highly loading all power-plant elements/components and high wear.

In an especially advantageous manner, redundancy shall be implemented using different physical principles. The commercial, battery based systems (also called USV's or UPS'S) of the state of the art incur the practical drawback of being susceptible—and very susceptible at low temperatures—to malfunctions. Accordingly, the combination of two supplies of different intrinsic operation is an explicit part of the present invention. An especially appropriate design feature is the combination of an economical battery storage with the highly reliable, if expensive, capacitive storage (UltraCaps). To make possible feeding the control device for an extended time interval in the case of public power failure, the control device may be combined with a solar cell or with a small windmill or the like or with both to attain high supply reliability. The solar cell or the small windmill may be mounted advantageously at the top of the generator pod, underneath the rotor, to the side of the tower or, as regards offshore wind-driven power-plants, to a platform affixed to the tower. The attitude should be toward the wind's lee and/or windward sides to assure maximum supply reliability.

In yet another advantageous embodiment mode of the present invention, at least one more control device may be available, the first control device serving as the operational module and the second as the parallel module. This design offers the advantage of power generation always being maintained even if the control device malfunctions totally or only partly.

In still another advantageous embodiment mode of the present invention, at least one replacement element/component may be present for at least one of the electronic, electrical and/or electromechanical basic elements/components, where the basic elements/components and the replacement elements/components are mutually configured in such a way that, upon operational malfunction in a basic element/component, its function shall be assumed by the replacement element/component.

It is known to keep a replacement element/component in reserve for basic elements/components in the form of sensors such as a wind-speed measuring anemometer. However, these features so far have been used only for those sensors of which the defective display entails significant jeopardy to all or parts of the power-plant.

Keeping replacement elements/components in reserve offers the advantage that continuous operation of the wind-driven power-plant is assured even when a basic element/component fails.

Not every basic element/component requires the presence of a replacement element/component. A judicious pre-selection of basic elements/components would be advantageous with respect to selecting a replacement component. Illustratively, such preselection may relate to basic elements/components in which a malfunction would at once shut down the power-plant. However said preselection also may relate to basic elements/components which are empirically known to be subjected to special loads in wind-driven power-plants. Desirably again basic elements/components of known malfunctioning profiles should be present in duplicate.

In a further embodiment mode of the present invention, the wind-driven power-plant is designed for maintenance from a remote monitoring station.

Furthermore, the remote monitoring station may also be designed that it may act on the wind-driven power-plant's control device.

As a rule the control device of a modern wind-driven power-plant is designed that it may be parameterized by means of so-called control parameters, that is that it shall be adjustable for instance to be appropriate for the particular kind of power-plant or the particulars of the site.

Also parameters relating to ambience and powerplant are fed to the control device, the power-plant ambience parameters for instance being air temperature, air pressure and wind speed. As a rule, the ambience parameters are measured by the power-plant sensors and the measurement data are transferred to the control device. Special parameters such as the requirements from the power network operator at a particular time however also may be fed externally for instance through data lines to the power-plant control devices.

Power-plant parameters relate to said power-plant and may be measured during operation at the power-plant and be communicated to the control device. These parameters, for instance, are the magnitude of the electric power, rotor rotational speed, generator rotational speed, blade attitude, power-plant temperature or the temperature of specific elements/components, modules or sub-assemblies, hydraulic pressures, data regarding electric currents or voltages etc.

Remote maintenance of a wind-driven power-plant using a remote monitoring system on one hand offers the advantageous ability to check said plant remotely. For instance the plant operator may inquire by means of the remote monitoring system about the power test results. However, operational malfunction in said power-plant also may be displayed by the remote monitoring system, and, in an advantageous embodiment mode of the present invention, said remote monitoring system illustratively also may be designed to let an expert carry out a complete defect diagnosis via the remote monitoring system in order to identify the cause(s) of malfunction.

Remote monitoring access to the control device furthermore offers the advantage that changes in control, ambience and power-plant parameters may be fed to said device. In this manner the present invention also allows transmitting for instance a new operations software by means of the remote monitoring system to the operational control computer of the drive device and to activate it.

Remote maintenance by means of the remote monitoring system moreover makes it possible—following power-plant defect diagnosis—to remedy the defect using said system and thereby keeping power-plant operation uninterrupted.

When the wind-driven power-plant is one of several power-plants in a wind park, the remote monitoring system may be integrated with or linked to the park control apparatus. Frequently, the total power outputs of the several wind-driven power-plants of a wind park may be fed jointly into the electric power network. To match the power-plant's total power output to power line requirements, this design of park control via the remote monitoring system makes it accessible to the power-plant and to accordingly modify latter's output.

In another advantageous embodiment mode of the present invention, the wind-driven power-plant may be designed in a manner that the control device shall manage operation by means of the ambience and power-plant parameters. In this respect the terminology "operations management" denotes both controlling/regulating the power-plant during operation to optimize power generation and the overriding operational management by means of the regulating and controlling operations that do not directly relate to power generation such as wind tracking, lubrication etc. and safety monitoring and any monitoring of the constituent sub-assemblies (diagnosis).

In general operations management of a wind-driven power-plant is designed in a manner that it shall be operated within the permissible limits of the ambience and plant parameters, said limits being defined by design parameters which in particular may be special control parameters. Illustratively, these design parameters may predetermine that the said plant shall be operating only within a given plant temperature range and that the generator output shall be reduced when this temperature range is exceeded in order that the power-plant temperature be lowered.

The design parameters moreover may require that the wind-driven power-plant be started very slowly if the external temperature should be very low, in the extreme case over a matter of hours, in order to allow thereby very uniform heating of all constituents/parts before the power-plant shall be operated under full load.

In another illustration, the design parameters may specify that at very turbulent wind conditions (gusts) the nominal rotational speed of the wind-driven power-plant shall be lowered in order to preclude the power-plant from running at excessively high speeds caused by strong gusts.

In typical operation for instance, the design parameters may be in the form of standard design parameters present in the operations managing computer of the control device, or else they may be computed from other data in the control device using the operations managing computer.

In one advantageous embodiment mode of the present invention, the operations managing computer may access temporary design parameters in the event of operational malfunction. The temporary design parameters may be stored in the operations managing computer for specific cases of malfunction, for instance failure of a basic function module. However, the operations managing computer also may generate/compute the temporary design parameters corresponding to such a failure, where called for, on the basis of data fed, for instance manually, to the operations managing computer.

By means of the temporary design parameters, the operations managing computer defines the temporary ranges, which match operations management, of permissible ambience and power-plant parameters, allowing maintaining the electric power output.

Illustratively, in this manner, if there is an operational malfunction in a total of four basic function modules in parallel, the nominal power output can be maintained in the frequency converter range provided that a desirable but not mandatory request to the public power operator be forsaken (for instance cos(p compensation), and/or the admissible external temperature is below a limit value (for instance 15° C., in order to especially effectively cool the frequency converter) and/or the generator rotational speed range is restricted (for instance ±10% of the rotational speed range instead of ±30% in nominal operation (to restrict the frequency converter's frequency matching).

The above described feasible design of the present invention offers the advantage that in spite of occurrence of malfunction, a response in the form of commensurately modifying the operational ranges of the ambience and power-plant parameters allows electrical power generation which preferably shall correspond to that of said plant in nominal operation.

Possibly, the modification of the operational ranges is permissible only over a given time interval, for instance because higher mechanical or thermal loads on an element/component would shorten life if extended longer. The present invention provides that such time limitations may be part of the temporary design parameters and that the control device shall shut off the power-plant when the limit value is exceeded or shall reduce its output power.

In a further embodiment mode, the operations managing computer may be programmed in a manner that it shall resort to the temporary design parameters until nominal power-plant operation has been restored.

The above cited designs make it possible to continuously operate a wind-driven power-plant, essentially by means of redundancies in elements/components, modules or sub-assemblies of the electrical assembly.

As regards the electrical assembly, in particular with respect to monitoring and control devices, the elements/components, modules and sub-assemblies amount to a highly developed network, as a result of which the redundancy in elements/components, modules and sub-assemblies entails a more than commensurately rising expenditure for connecting lines and switching devices. Furthermore electrical assemblies are in jeopardy of electrical shorts in a component entailing by means of said connections to consequential damages in other elements/components.

Accordingly, and in one advantageous embodiment mode of the present invention, the connection between at least two of the redundant elements/components and/or modules and/or sub-assemblies may be implemented exclusively or partly by at least one system of buses. In an especially advantageous embodiment the hooked-up elements/components are also conductively de-coupled by appropriately selecting the physical transmission medium (for instance in an optical medium using light guides). In an especially advantageous embodiment mode, the connecting lines of the bus system also may be redundant.

A bus system consists of bus users (for instance bus actuators, bus sensors, operations managing computer), a transmission medium (for instance bus cables or wireless links) and also a special software mounted on one of the bus users, in general the operations managing computer. The bus users comprise special bus hookup assemblies hooking up to the bus and assuring frictionless communication on the bus. The bus hookup assemblies consist of a processor (controller), a software and of a hookup unit ("transceiver") implementing signal transposition to the transport medium. The bus sensors are the power-plant's sensor elements which are also used for element/component monitoring, whereas the bus adjusting elements represent the elements/components and basic function modules through which the commands can be carried out. The transport medium in this design may be a conventional wire cable or in the form of optical fibers. When used in a wind-driven power-plant, the optical version offers the advantage of electromagnetic compatibility and being safe from lightning because signal lines frequently must be laid in close proximity to power cables over long distances.

The design of the present invention concerning the bus system applies to any kind of bus system, for instance CAN-Bus, in particular CANopen-Bus, Ethernet, Profibus, DP/FMS, Interbus, TTP, FlexRay.

Advantageously, the bus system is used both to transmit all signals required regarding control and operations management and to monitoring and activating the redundant design of the present invention. Obviously, the present invention also covers embodiment modes wherein signal transmission regarding control and operations management shall be entirely separate from the signal transmission regarding monitoring and activating redundant modules.

Accordingly, the invention's advantageous design offers a way to recognize, especially using a correspondingly programmed operations managing computer and the bus system, a defect in an element/component/module/sub-assembly, thereupon the replacement element/component being activated for signal transmission without incurring the need for switching connection lines, as a result of which power-plant operation is maintained. An additional monitoring device might also be used.

However, depending on the kind of element/component/module/sub-assembly, additional connection lines might require switching to transmit the power.

In this respect, the bus system is preferably implemented in the form of a network, whereby all essential function modules may communicate with one another even in the event of failure of individual communication paths. In that case each essential function module must be designed as a bus user, the higher costs so incurred, however, being compensated by the higher reliability of power generation.

In another advantageous further embodiment mode of the present invention, further smart bus users are operative besides the operations managing computer. This feature can be implemented either by means of additional smart nodes or by individual function modules connected to the bus system and fitted with their own "smart" microprocessors. These bus users, which are generally called smart bus function modules, are programmed in a manner to carry out individual tasks. Illustratively the smart bus function module assumes its own independent monitoring of part of the bus system and of the hooked-up elements/components and it shall introduce steps to switch over to parallel modules (smart bus system) in the event of failures.

Excellent reliability is attained for instance by using an error-tolerant bus system which for instance in the event of a bus user defect or an interruption of a connection line undertakes reconfiguring the entire network and thereby saves the entire bus system from operational failure.

Accordingly, using a smart bus system offers on one hand the advantage of automatically recognizing and eliminating defects without thereby affecting the capacities of the control computer and on the other hand the need to shut off only a considerably smaller portion of the bus system in the event of failure in a smart bus system having several smart branch off sites than in a system containing only one smart bus function module (as a rule the operations managing computer).

In a further advantageous embodiment mode of the present invention, the minimum of one rotor blade may be mounted in angularly adjustable manner relative to the rotor. This design offers the advantage that the application of wind energy/power to the rotor is variable due to changing the blade's angular position so that electric power generation also may be maintained in the presence of strong winds without the power-plant being unduly loaded. Furthermore, power generation can be regulated by adjusting the rotor blade angle in such a manner that said power shall match the electric network requirements.

In an especially advantageous design of the present invention, the wind-driven power-plant may comprise an electric assembly containing a further sub-assembly in the form of a blade adjusting device regulating the angular position of the rotor blade(s).

In a further advantageous embodiment mode of the present invention, the hook-up of the generator to the electric network is designed in a manner that the generator may be run at least at two different rotational speeds at the network, said device moreover in an especially advantageous embodiment of the present invention allowing to operate the generator within a variable speed range.

The above embodiments relate both to hookup devices for pole-reversing generators and to hookup devices that comprise, due to electromechanical, electric or electronic elements/components a speed range limited by an upper and lower speed limit, said lower speed limit also including 0 rpm, to vary generator speed between said limits.

Furthermore, a converter sub-assembly is provided in an advantageous embodiment mode of the present invention to match the generator power to the particulars of the electric network by means of several active switches such as thyristors, GTOs, IGCTs or IGBTs.

In a further advantageous embodiment mode of the present invention, the above active switches can be driven by a conversion control which is configured in the converter sub-assembly and which illustratively is connected to the control device.

According to one embodiment mode of the present invention, a function module may be designed in a manner that it comprises at least the active switches or some of the active switches of the converter sub-assembly. Several function modules that include active switches in relation to their switching needs also may be used An especially preferred embodiment mode of the present invention uses an AC generator. Such generators are characterized by high reliability and are especially economical.

A converter sub-assembly hooking up such a generator to the electrical network may be designed according to a further embodiment mode in a way that it comprises an AC rectifier (diode rectifier or conversion element with active switch) near the generator to which it is connected and rectifying AC current at least partly into DC current or DC voltage. The converter sub-assembly also may comprise a DC current intermediate circuit or a DC voltage intermediate circuit connecting a generator-side AC rectifier to a DC inverter at the network-side. The network-side DC inverter is hooked up to the network and is used to convert the DC current or voltage generated by the generator-side AC rectifier into the electric power matching the electrical network. Also, electromechanical safety elements protecting the power-plant and filters limiting, for instance, the steepness of applied voltage at the generator-side and improving network quality at the network-side may be present in the converter sub-assembly.

In especially advantageous manner, the generator-side AC rectifier is fitted with active switches to allow a power flow in the converter sub-assembly in both directions and furthermore making possible reactive power. In this manner, generator excitation and reactive power generation may be controlled, as a result of which the generator may be designed to be especially economical.

In an especially preferred embodiment of the present invention, a function module may be designed in a way that it comprises at least the generator-side AC rectifier, the current or voltage intermediate circuit and the network-side DC inverter. Said function module however may also contain further elements such as the electrical safety elements or the filters.

This configuration is highly advantageous because allowing to hook together extant converters into very high power output aggregates so that development times may be shortened with a view toward the explosively increasing bulks of wind-driven power-plants.

Another very advantageous embodiment mode of the present invention comprises at least one parallel module for the above stated embodiments of the converter's function modules, the function module(s) and the parallel module(s) being connected by separable connectors directly or indirectly to the generator and directly or indirectly (for instance by an intermediate transformer unit) to the electrical network.

The above especially advantageous embodiment mode of the present invention is based on the insight that the active switches of a converter sub-assembly are especially susceptible to malfunctioning. In view of their substantial numbers, their integration in the manner of the invention by means of function modules into the electric assembly offers a simple and effective way to isolate any damaged/failing module by opening the separable connectors/hook-ups and in this manner to maintain power generation entirely or at least in a more limited way by means of the remaining operational function and parallel modules.

The preferably complete isolation of the failed function module is important in that otherwise one or more modules adjoining the one that failed for instance due to a short might in turn be damaged.

One advantageous embodiment mode of the present invention implements the separable hookups in the form of switching elements. One of the advantages offered by this design is that it allows even less skilled personnel to open, even manually, the separable hookup, no prior know-how being required as long as the switching elements are unambiguously marked.

In an especially advantageous manner and in particular for offshore power-plants in the planning stage, a further development of the present invention provides that the switching elements be operable by the remote monitoring device. In that case no technician at all need be on site for the purpose of keeping up power generation, at least partly, following function module malfunction.

In further advantageous embodiment modes, the switching elements also may be driven automatically for instance by means of the control device and/or the remote monitor.

A further and very advantageous embodiment mode of the present invention provides that at least one separable hookup comprise two series switching elements, one of which is a power switch and the other an active switch (for instance a thyristor). This invention is based on the insight that a power switch in addition to just switching also acts as a safety element by tripping at overload down to a limit current. On the other hand, a power switch is appropriate only for a very limited number of switching cycles, as a result of which higher rates of switching are taken over by the series contactor that, however, offers no safety function. In this simple and effective manner a configuration of function module and parallel module of similar function is being created whereby, if a malfunction arises in one of the modules, the other shall take over almost entirely the first one's function.

Further features, aspects and advantages of the present invention are disclosed in part by the text below and are partly made clear by the specification or result when reducing the present invention to practice. One embodiment mode of the present invention is discussed in detail below. It should be understood that other embodiment modes may be used and may be modified without thereby transcending the present invention. The comprehensive discussion below therefore must be viewed broadly and the invention's scope is best defined by the appended claims.

BRIEF DESCRIPTION OF THE DRAWINGS

The invention is elucidated below in relation to an illustrative embodiment.

DETAILED DESCRIPTION OF THE INVENTION

Figure 1:
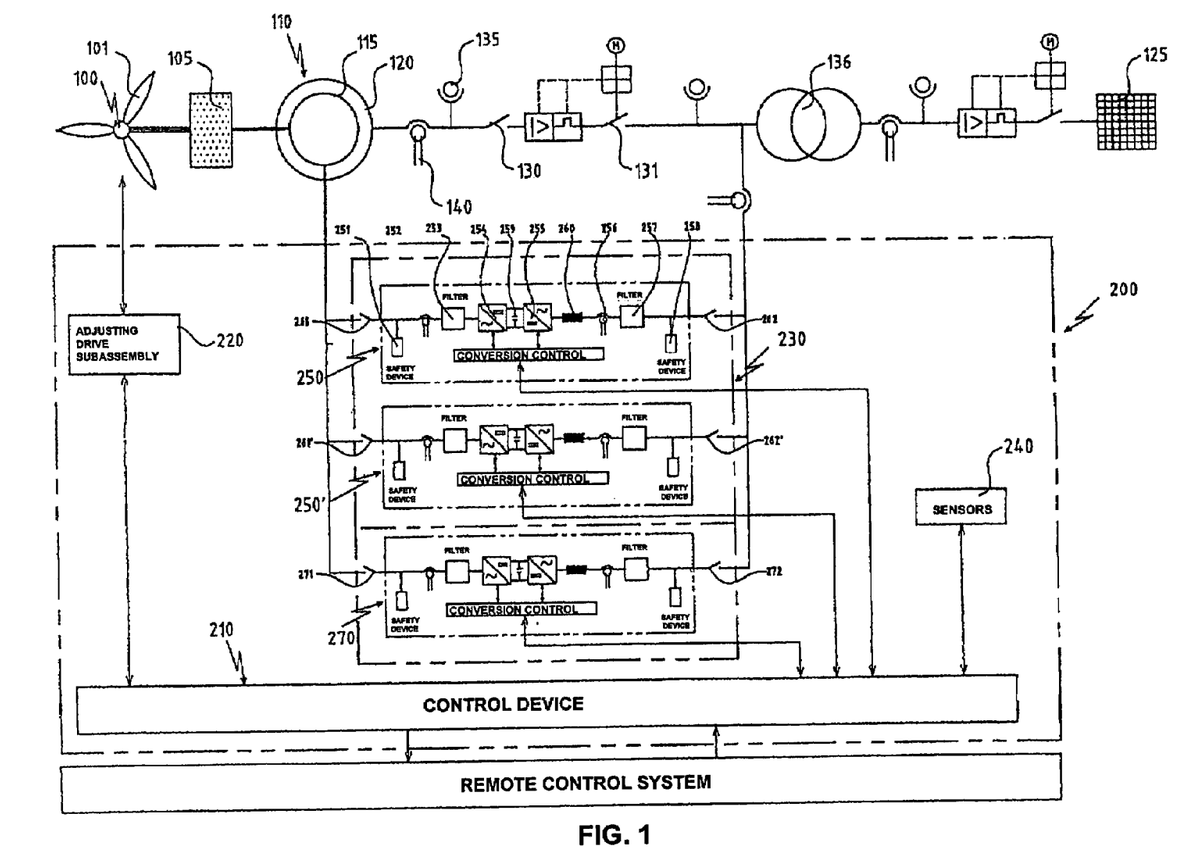
FIG. 1 shows an electrical assembly of the invention used in a wind-driven power-plant.

FIG. 1 shows a power-plant's rotor 100 fitted with angularly adjustable blades 101, the wind setting the rotor into rotation. The rotor 100 is connected through a gearbox 105 to a generator 110 and generates electric power by means of its rotation.

The generator 110 comprises its own rotor 115 and a stator 120, the latter being connected through at least one transformer 136 to an electric network 125. A switching element 130 (for instance a contactor or an active switch such as IGBT or a thyristor switch or the like) and a power switch 131 or the like are mounted in series between the generator stator 120 and the electric network 125 and when in their closed state connect the generator 110 to the electric network 125. When required, for instance if demanded by the operator of the electric network 125, said network can be disconnected from the generator 110 by opening the above switches.

A device measuring the electric voltage 135 and a device measuring the electrical current 140 are furthermore configured to the generator 110 and the electrical network 125 to monitor the generated electric power.

The generator rotor 120 is connected to an electric assembly 200. The assembly 200, as shown, comprises the following sub-assemblies: a control device 210, a blade adjusting unit 220 and a converter sub-assembly 230.

The control device 210 implements regulation and operations management of the wind-driven power-plant. Accordingly the control device 210 is connected to the other sub-assemblies of the electric assembly 200 and is able to regulate and control said other sub-assemblies in a manner to attain optimum power generation that additionally meets the network requirements of the operator of an electric network 125. All significant parameters such as ambience and power-plant parameters are fed to the control device 210. The ambience parameters, for instance, are ambient power-plant data such as atmospheric pressure, air temperature or wind speed, which are measured by sensors 240. Power-plant parameters are measured values affecting power-plant operation, that furthermore may be measured by test equipment illustratively measuring the voltage 135 and the electrical current 140.

In the shown embodiment, the control device 210 is connected to a remote monitoring station of arbitrary location. The expression "remote monitoring station" connotes both site-independent monitoring and/or a wind-park control.

Besides the sub-assemblies 220, 230, the control device 210 also controls in a conventional manner a plurality of accessories such as wind tracking elements, refrigeration and oil supply etc. which have been omitted for the sake of clarity.

The blade adjustment sub-assembly 220 regulates the angle of the rotor blades 101 relative to the rotor 100. Angular rotor blade regulation is implemented by the control device 210 driving the blade adjustment sub-assembly. Regulating the angular position also allows setting optimum power generation by the wind-driven power-plant. Furthermore, the power-plant may be shut down by rotating the rotor blades into the so-called feathered pitch position. This expression in general means rotating the rotor blades 101 until the wind encounters only a minimal effective surface.

In the shown embodiment, regulation of generator output power into a power corresponding to the network requirements of an electrical network operator is implemented by means of so-called double-fed asynchronous generator.

A large portion of the generated power is absorbed in the generator stator 120. A smaller portion of the generated power is fed through the generator rotor 115 into a converter sub-assembly 230 and then is fed jointly with the stator power into the electrical network 125. The power "branched-off" through the generator rotor 115 is converted in such a way by the converter sub-assembly 230 that the power fed into the network meets the network requirements.

Known converter sub-assemblies for double-fed operation of a wind-driven power-plant in general comprise a generator-side AC rectifier connected to the generator rotor and a network-side DC inverter connected to the electrical network. Depending on the mode of operation, the generator-side and the network-side rectifiers and inverters are connected via a DC voltage or a DC current intermediate circuit. Moreover, known converter sub-assemblies are fitted with generator-side and network-side safety elements and filters.

The shown converter sub-assembly 230 is an advantageous embodiment of the invention.

The shown converter sub-assembly 230 further extends a known converter sub-assembly in that the above known parts are combined into one function module 250. The function module 250 comprises the following elements/components: a generator-side safety element 251 (for instance Crowbar, lightning and/or excess voltage protection), a current measuring element 252, a generator-side filter and a generator-side AC rectifier 254. Furthermore, the function module 250 includes the following elements/components: network-side DC inverter 255, network choke 260, network-side current measuring element 256, network-side filter 257, network-side safety element 258, the generator-side AC rectifier and the network-side DC inverter being connected via a DC voltage intermediate circuit 259.

The converter sub-assembly is advantageously designed so that a second function module is associated to the first, both being sized that they can convert in equal portions the power drained through the generator rotor 115. This design offers the advantage in the event of failure of one function module that the rotor power may still be converted, at least in part, and that the power-plant may continue to be operational even if at less than maximum power.

In a further advantageous embodiment of the invention the shown converter sub-assembly 230 comprises a parallel module 270 which in this instance is identical with the function modules 250 and 250'.

The parallel module 270 is integrated in such manner into the converter sub-assembly 230 that in the event one function module 250, 250' should fail, it may assume its nominal operations. Therefore there is assurance that even if one of the function modules 250, 250' should fail, power generation shall be maintained fully.

The function modules 250 and 250' can be isolated from the electrical assembly 200 by means of generator-side switches 261, 261' and network-side switches 262, 262'. The same feature applies to the parallel module 270, namely it can be isolated from the electrical assembly by the generator-side switch 271 and by the network-side switch 272.

In ordinary operation, closing the switches 262, 261', 262, 262' will convert generator-rotor power by means of the function modules 250, 250', the parallel module 270 being isolated by the open switches 271, 272 from the electrical assembly 200. If one function module 250, 250' fails, opening the corresponding switches of the defective function module will entail isolation from the electric assembly and the switches 271, 272 will be closed, hence integrating the parallel module 270 into the electrical assembly 200, whereby the rotor power shall be converted by means of the operational function model 250, 250' and the parallel module 270.

By means of rectifier/inverter control, conversion control took place in the function modules 250 and 250' and also in the parallel module 270, the conversion control again being hooked up to the control device 210. In principle, conversion control also may be directly integrated into the control device or be consolidated centrally into one aggregate controlling the entire converter sub-assembly (in lieu of the locally shown divisions into individual modules).

FIG. 1 only shows the structural parts needed to elucidate the above embodiment mode. Further structural parts essential for the design and operation such as fuses/circuit breakers or the detailed structure of the Crowbar elements are omitted for sake of clarity.

Figure 2:
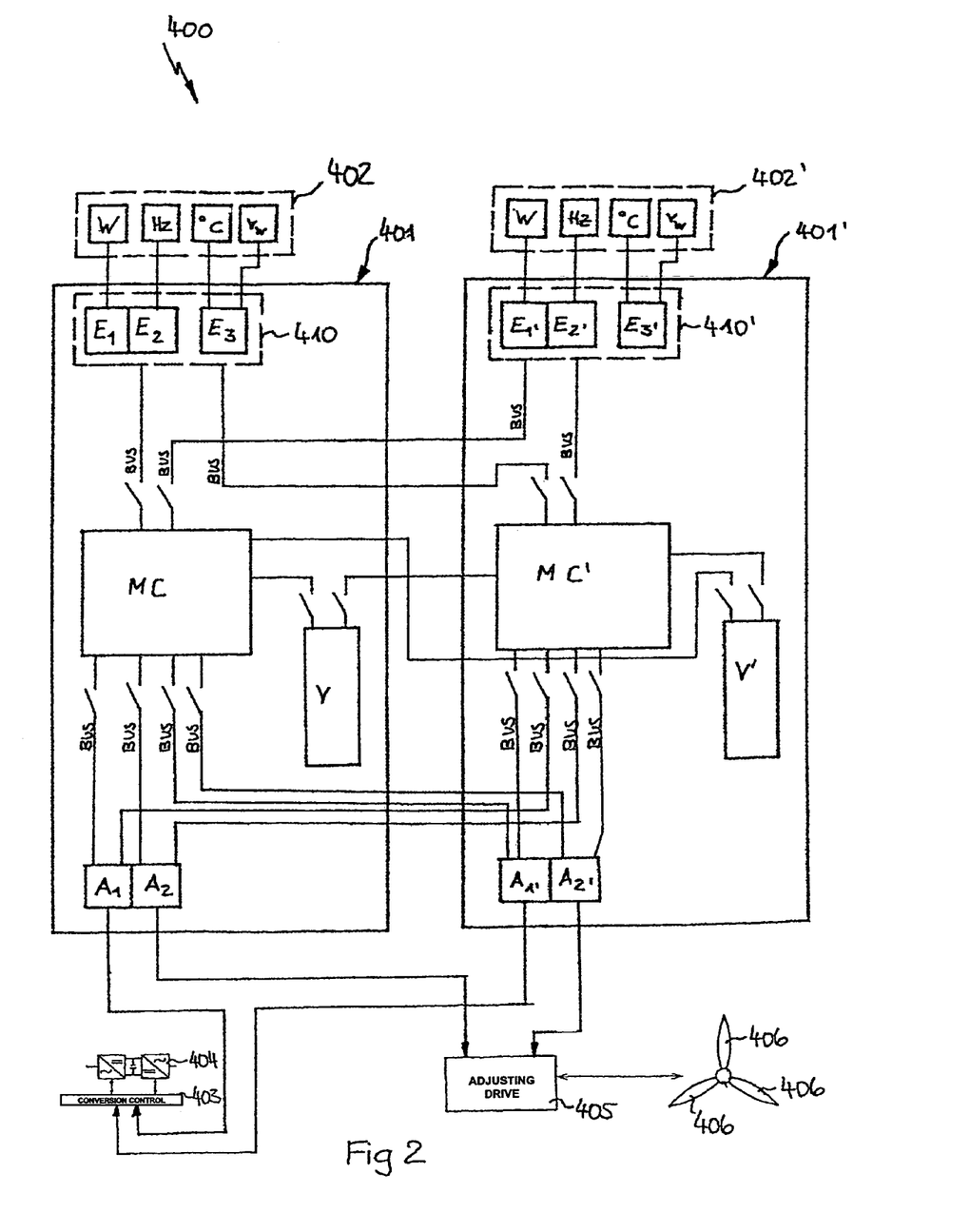
FIG. 2 shows redundant control devices of a power-plant of the invention.

FIG. 2 shows an illustrative embodiment of the redundant design of a control device.

The redundant control device 400 shown in FIG. 2 comprises two switch cabinets 401 and 401'. Operations managing computers MC and MC' acting as microcontrollers are mounted in the switch cabinets 401 and 401'. Each operations managing computer MC and MC' is respectively powered electrically from a power supply V and V'

The redundant control device 400 moreover comprises a "sensors" function module 402 to which is assigned a "sensors" parallel module 402'. Elements detecting data required to operate the power-plant are configured in the sensor modules 402 and 402'.

In the shown embodiment, the sensor modules illustrated contain a measuring element W to sense the generated electric power, a measuring element Hz to detect the frequency, and measuring elements ° C. and $v_w$ to respectively detect, for instance, ambient temperature and wind speed. Typically, modern wind-driven power-plants comprise at least 50 to 100 different sensors, and accordingly the shown embodiment mode is highly simplified. Moreover additional or other sensor elements may be integrated into this function module or into another, to provide corresponding parallel modules that, in the light of the invention, assuredly may be designed to carry out other operations than the function module though merely similar ones, whereby an identical, a similar, or at least an operationally consistent function may be carried out.

Furthermore, the redundant control device 400 comprises inputs E1, E2 and E3 and outputs A1 and A2 configured in the switch cabinet 401. The inputs E1, E2 and E3 in this shown embodiment mode are combined into a function module 410, where the inputs E1 and E2 are respectively connected to the elements W and Hz of the sensor module 402 and the input E3 to the elements ° C. and $v_w$. In a corresponding manner, inputs E1', E2' and E3' and outputs A1' and A2' are configured in the switch cabinet 401' and are connected to the sensor module 402', the inputs E1', E2' and E3' being combined into a parallel module 410'

The outputs A1 and A1' each are connected to a converter control 403. The purpose of the converter control 403 is to so control the converter 404 that electric power shall be generated which on one hand regulates, by means of the adjusted torque, the rotor speed within the nominal range and on the other hand meets the requirements of the public electric network. The outputs A2 and A2' on the other hand are connected to a blade adjusting drive 405 by means of which the angular adjustment of the rotor blades 406 to adjust a required electrical power is carried out The two operations managing computers MC and MC' in the switch cabinets 401 and 401' are connected by a bus system respectively to the input function modules 410 and 410', the two power supplies V and V' and the outputs A1, A1', A2, A2'.

The above described embodiment mode of a redundant control device makes it possible in the event of a part's failure or failure of a function module to activate the corresponding replacement element/component or the corresponding parallel module.

If, for instance, an element of the sensor function module 402, or even the full module, were to fail, then the operations managing computer MC may access the sensor parallel module 402' after the bus has been switched. If additionally another defect should be incurred, namely that the connection between MC and output A1 should fail, then, when the bus line has been switched, the operations manager computer MC may access through output A1' the conversion control. Similar conditions apply in the event the power supply V to the operations managing computer MC should fail. In that case there would be on one hand the feasibility of the power supply V' assuming the supply to the operations managing computer MC or that the operations managing computer MC' would be activated.

The redundant control of the above embodiment mode therefore is designed in a manner that in the presence of failure or defect in a part/element/component or a function module it shall always be possible to switch over to replacement/standby operation and in this manner to maintain proper or even restricted wind-driven power-plant operation.

The invention claimed is:

1. A wind-driven power-plant comprising a rotor (100) having at least one blade (101) and connected directly or indirectly to a generator (110) generating electric power, further comprising an electrical assembly (200) made up of different sub-assemblies (210, 220, 230, 400) containing basic electronic, electrical and/or electromechanical and/or sensor elements/components and/or electrotechnical safety elements,
    wherein all elements/components or specific elements/components of an electric sub-assembly (210, 220, 230, 400) are combined according to their purposes into one or more function modules (250, 250', 410) that implement a function relating to electric power generation, at least one parallel module (270, 410') being associated with at least one function module (250, 250', 410) and in normal operation of said power-plant implementing as needed an identical or similar function as the function module (250, 250', 410), where the function module (250, 250', 410) and the parallel module (270, 410') are connected or connectable to each other in a manner that, in the event of operational malfunction during which one function module (250, 250', 410) or a parallel module (270, 410') fails, the remaining operative function module or parallel module (250, 250' 270, 410, 410') at least partly maintains power generation,
    wherein an electric sub-assembly comprises at least one control device to optimize electric power generation, the control device (400) including at least one operations managing computer (MC, MC'),
    wherein the electrical power feeding the control device (400) is obtained from at least one power source module (V, V'), and
    wherein at least one power source module (V, V') is designed to be independent of a public electric network.

2. The wind-driven power-plant as claimed in claim 1, wherein the parallel module (270, 410') is designed in a way that it fully assumes the function of the function module (250, 250', 410) when the latter fails.

3. The wind-driven power-plant as claimed in claim 1, wherein said wind-driven power-plant comprises at least two function modules (250, 250', 410) implementing identical or similar functions and furthermore at least one parallel module (270, 410') that preferably completely assumes the function of a function module (250, 250') when the latter fails.

4. The wind-driven power-plant as claimed in claim 1, wherein the electrical assembly includes at least one more control device, the first control device being designed as a function module and the second control device as a parallel module.

5. The wind-driven power-plant as claimed in claim 1, wherein at least one of the basic electronic, electrical and/or electromechanical elements/components is associated with a replacement element/component, where the basic electronic, electrical and/or electromechanical elements/components and the replacement elements/components are connected to each other in a manner that in the event of a basic electronic, electrical and/or electromechanical element/component failure, its task shall be assumed by the replacement element/component.

6. The wind-driven power-plant as claimed in claim 1, wherein maintenance of the wind-driven power-plant may be implemented at a distance from a remote monitoring system.

7. The wind-driven power-plant as claimed in claim 6, wherein the remote monitoring system is designed to access the control device.

8. The wind-driven power-plant as claimed in claim 7, wherein the remote monitoring system is designed in way that failure of a function module (250, 250') may be diagnosed by means of the remote monitoring system.

9. The wind-driven power plant as claimed in claim 8, wherein the remote monitoring system is designed in a way that defect remediation can be implemented by means of the remote monitoring system.

10. The wind-driven power-plant as claimed in claim 6, wherein parameters of ambience and power-plant are fed to the control device which by means of said parameters operationally manages said power-plant, permissible ranges of said ambience and power-plant parameters being defined by design parameters.

11. The wind-driven power-plant as claimed in claim 10, wherein the design parameters are standard design parameters stored in the operations managing computer in normal operation.

12. The wind-driven power-plant as claimed in claim 10, wherein in the event of operational malfunction, the operations managing computer accesses temporary design parameters that are stored in the operations managing computer and/or are generated therein and/or are fed to it, where those temporary range limits matching operational management relating to permissible ambience and to power-plant parameters are defined which allow maintaining at least for some time generation of electrical power.

13. The wind-driven power-plant as claimed in claim 12, wherein the temporary range limits can be fed directly from the remote monitoring system into the operations managing computer.

14. The wind-driven power-plant as claimed in claim 12, wherein the temporary range limits can be fed directly from the remote monitoring system into the operations managing computer.

15. The wind-driven power-plant as claimed in claim 1, wherein at least two circuit elements/components/function modules and/or parallel modules (250, 250', 270)/electrical sub-assemblies (210, 220, 230) are connected to each other by separable hookup means.

16. The wind-driven power-plant as claimed in claim 1, wherein at least two circuit elements/components/function modules and/or parallel modules (250, 250', 270)/electrical sub-assemblies (210, 220, 230) are connected to each other by a bus system which comprises bus users, at least one transmission medium and software.

17. The wind-driven power-plant as claimed in claim 16, wherein the bus system is annular or a network structure.

18. The wind-driven power-plant as claimed in claim 16, wherein at least one bus user comprises a microprocessor which is programmable in a way that besides other features it also can monitor the proper operation of at least one circuit element/component, of a function module or parallel module (250, 250', 270) or of an electrical sub-assembly (210, 220, 230) and that in the event of malfunction of a circuit element/component, of a function module or parallel module (250, 250', 270) or of an electrical assembly unit (210, 220, 230) it can switch over to a replacement circuit element/component or to an operative function module or parallel module (250, 250', 270) or to an electrical assembly unit (210, 220, 230).

19. The wind-driven power-plant as claimed in claim 1, wherein at least one rotor blade (101) is angularly adjustable.

20. The wind-driven power-plant as claimed in claim 19, wherein the electrical sub-assemblies (210, 220, 230) furthermore include a rotor adjustment unit to regulate the angular setting of the minimum of one rotor blade (101).

21. The wind-driven power-plant as claimed in claim 1, wherein a hookup element/component located between the generator (110) and an electrical network (125) is designed in a manner that the generator can be operated at least at two different rotational speeds, preferably within a variable rotational speed range, at the electrical network (125).

22. The wind-driven power-plant as claimed in claim 21, wherein the hookup element/component between the generator and the electrical network is a converter sub-assembly (230) fitted with several active switches.

23. The wind-driven power-plant as claimed in claim 22, wherein the converter sub-assembly (230) is fitted with at least one conversion control which allows actuating the active switches.

24. The wind-driven power-plant as claimed in claim 23, wherein the conversion control is connected to the control device.

25. The wind-driven power-plant as claimed in claim 24, wherein at least one function module (250, 250') comprises at least a portion of at least the active switches of the converter sub-assembly (230).

26. The wind-driven power-plant as claimed in claim 22, wherein the generator (110) is an AC generator, in that the converter sub-assembly (230) comprises a rectifier (254) situated at the generator side and coupled to this generator (110) and changing the AC current at least in part into a DC current or into a DC voltage, in that the converter furthermore includes a DC current intermediate circuit or a DC voltage intermediate circuit (259) which connects the generator-side rectifier (254) to at least one network-side inverter (255) connected to an electric network (125), the network-side inverter (255) converting the DC current or DC voltage into electrical power matching the electric network (125).

27. The wind-driven power-plant as claimed in claim 26, wherein the generator-side rectifier is fitted with active switches.

28. The wind-driven power-plant as claimed in claim 26, wherein a function module (250, 250') comprises at least the generator-side rectifier (254), the DC current or voltage intermediate circuit (259) and the network-side inverter (255).

29. The wind-driven power-plant as claimed in claim 25, wherein the function module (250, 250') is associated with at least one parallel module (270), the function and parallel modules being directly or indirectly connected by separable hookup elements (261, 262, 261', 262', 271, 272) to the generator (110) and/or directly or indirectly to the electrical network (125).

30. The wind-driven power-plant as claimed in claim 29, wherein if a function or parallel module (250, 250', 270) should fail, said module shall be isolated in the electrical assembly by opening the separable hookup elements (261, 262, 261', 262', 271, 272).

31. The wind-driven power-plant as claimed in claim 29, wherein the separable hookup-elements (261, 262, 261', 262', 271, 272) include at least one switch.

32. The wind-driven power-plant as claimed in claim 31, wherein the switch is operated manually.

33. The wind-driven power-plant as claimed in claim 31, wherein the switch is remote-controlled.

34. The wind-driven power-plant as claimed in claim 31, wherein the switch is automatically operated by the control device or by the remote monitoring system.

35. The wind-driven power-plant as claimed in claim 29, wherein at least one separable hookup (261, 262, 261', 262', 271, 272) comprises two series switch elements of which one is a power switch and the other a contactor.

* * * * *